F. N. LABELLE.
PRESSURE REGULATING VALVE.
APPLICATION FILED MAR. 18, 1909.

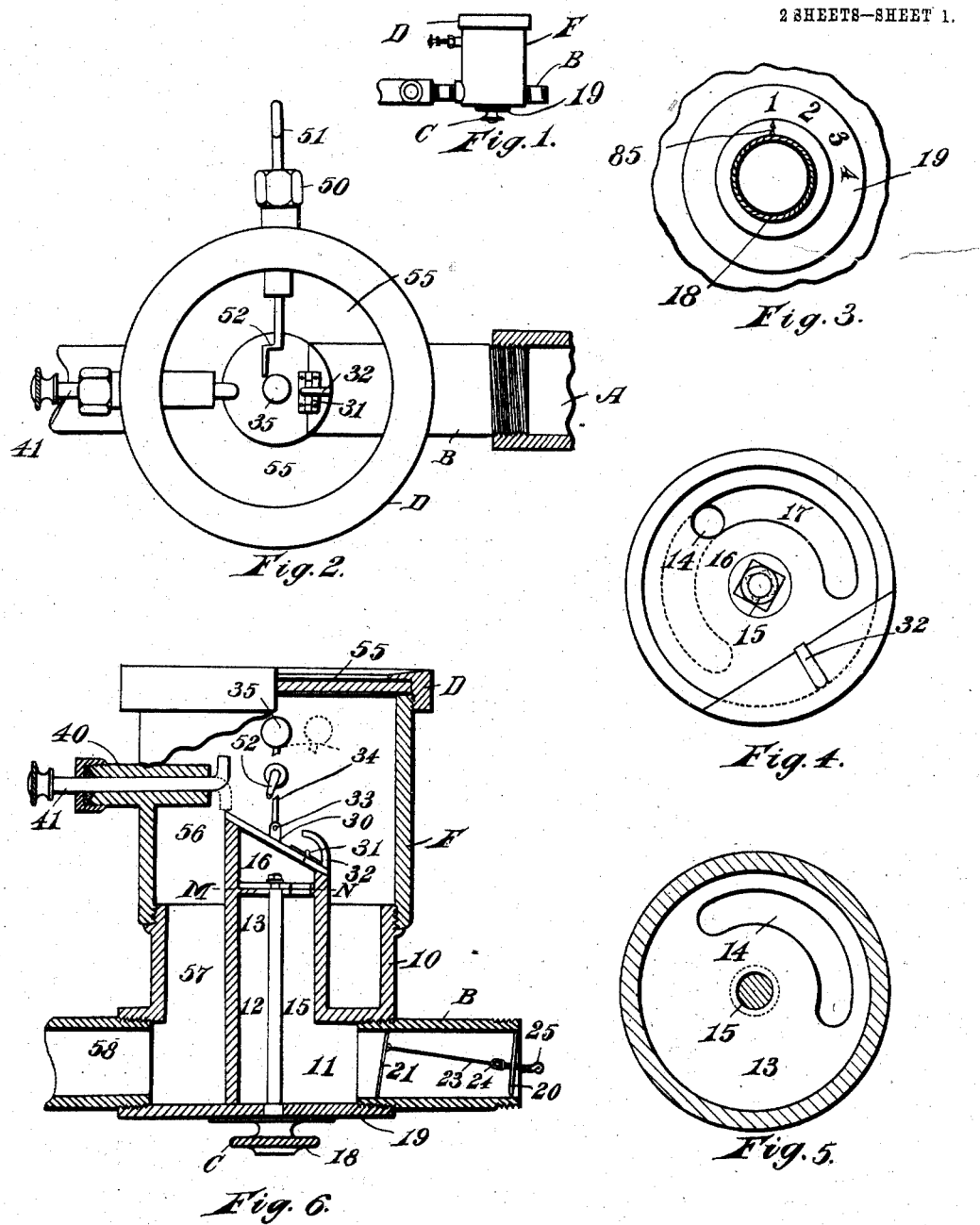

927,252.

Patented July 6, 1909.
2 SHEETS—SHEET 2.

WITNESSES:
Ruth L. Eaton.
Geo. P. Longfellow.

INVENTOR
Ferdinand N. Labelle
BY
Gardner W. Pearson
ATTORNEY

UNITED STATES PATENT OFFICE.

FERDINAND N. LABELLE, OF LOWELL, MASSACHUSETTS.

PRESSURE-REGULATING VALVE.

No. 927,252.          Specification of Letters Patent.          Patented July 6, 1909.

Application filed March 18, 1909. Serial No. 484,151.

*To all whom it may concern:*

Be it known that I, FERDINAND N. LABELLE, a citizen of Canada, residing at Lowell, in the county of Middlesex and State of Massachusetts, have invented certain new and useful Improvements in Pressure-Regulating Valves, of which the following is a specification.

This invention relates to pressure regulating valves and is intended especially for controlling the pressure of illuminating gas and the amount of gas delivered to burners.

The invention consists of a peculiar form of delivery valve which adjusts itself to the gas pressure and controls that pressure by suitable means. This means can be adjusted to varying strengths so that the pressure of the gas delivered and the amount thereof can be regulated from the outside without shutting off the gas from the valve. I prefer to provide a transparent window through which the valve and the regulation thereof can be seen. My valve regulates the pressure for one or more burners and, as stated, is provided with means for changing the pressure from the outside when desired. It is preferably used in connection with an automatic flow regulator and with independent means for regulating the size of the conduit.

My invention is shown in the accompanying drawings in which—

Figure 7:
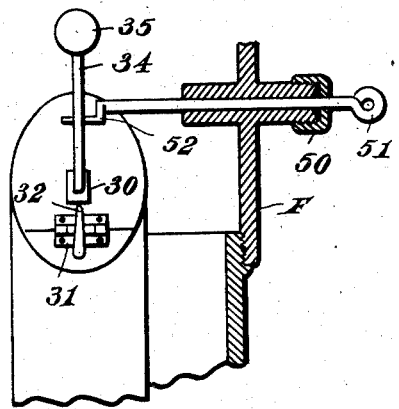
Figure 9:
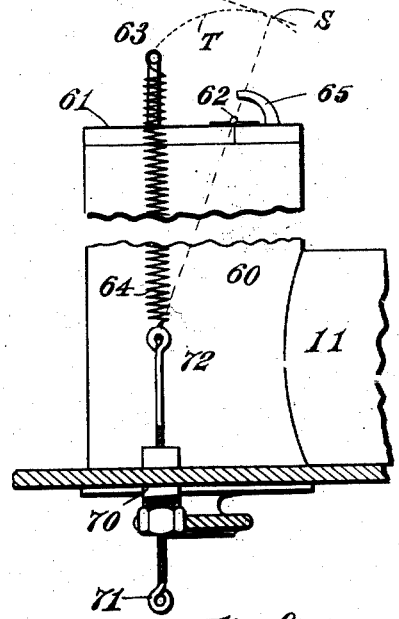
Figure 8:
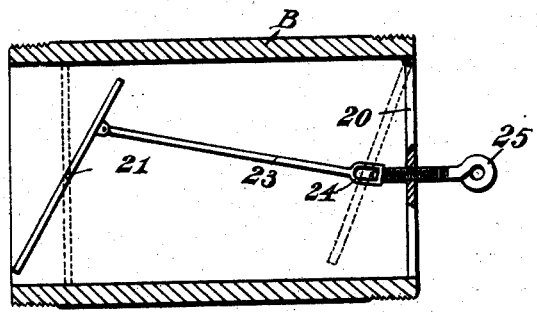
Figure 11:
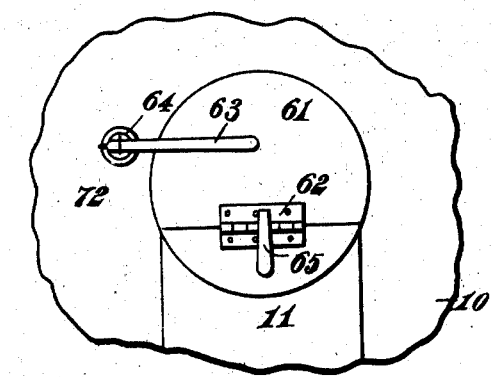
Figure 10:
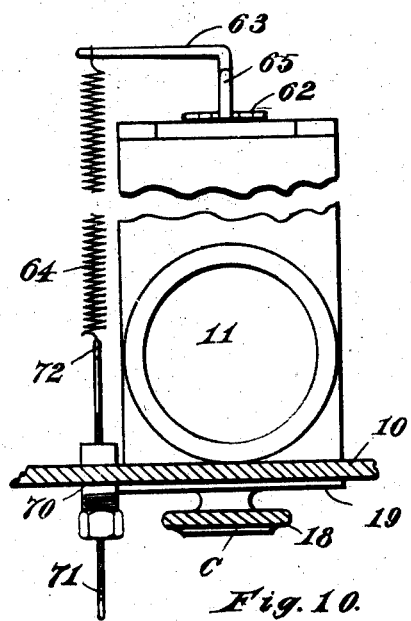

Figure 1 is a small side view of my governor. Fig. 2 is a top view. Fig. 3 is a bottom view of the dial of the adjuster. Figs. 4 and 5 are detail views of the adjuster valve. Fig. 4 is a view from the top with the delivery valve removed and Fig. 5 is a sectional view on line M N of Fig. 6 showing the fixed disk. Fig. 6 is a side sectional view of the complete regulator. Fig. 7 is a sectional view of the delivery valve as from the right of Fig. 6. Fig. 8 is a side sectional view of the inlet regulator. Fig. 9 is an enlarged detail side view of an alternative construction for the delivery valve in which a spring is used instead of a weight. Fig. 10 is a view from the right of Fig. 9. Fig. 11 is a top view of the same construction.

A represents a coupling on the inlet pipe from the source of gas supply. The inlet pipe may be of any size.

B is an inlet tube which is attached to the end of the inlet pipe by coupling A and is also screwed into the main regulator casing or casting 10. Inside of tube B, I hang at the top on any suitable pivot a heavy gravity valve or more properly a clapper 20. See Fig. 8. I also provide a balanced valve 21 pivoted on its horizontal axis on suitable pivots. A rod 23 connects clapper 20 with the upper segment of balanced valve 21. This rod 23 is pivoted to the upper part of balanced valve 21 and at its other end has a ring 24 which is swiveled on the end of adjusting ring bolt 25 which passes through a suitable threaded orifice in clapper 20. By turning ring bolt 25, the length of the connection between clapper 20 and valve 21 can be adjusted and the flow of gas through the inlet tube B increased or diminished. By this means, the relation between the two valves is adjusted for a certain predetermined flow of gas. It is evident that if the outlet from tube B was unimpeded, the gas under pressure would rush by clapper 20 with such force that it would be raised to the position shown in the dotted lines thereby closing balanced valve 21. This would entirely stop the flow, were it not for the fact that as clapper 20 opens, valve 21 closes and thereby reduces the size of the outlet for the gas. This reduces the flow and the pressure on clapper 20, which therefore falls back carrying valve 21 with it. The result is a balancing between the clapper and valve whereby a predetermined flow is obtained at all times. To aid this result, I make valve 21 very light and clapper 20 considerably heavier. The result is that I obtain a uniform pressure and a uniform volume of gas at the outlet of tube B no matter what the pressure is at the inlet. This pressure and flow may be regulated by adjusting the length of rod 23.

Tube B is screwed into a suitable passage 11 in casing 10 and this passage enters a vertical passage 12, which is closed by an adjuster C. Near the top of passage 12 is a fixed closure disk 13 which has an oval opening 14. Through a central passage in said disk, I pass a spindle 15 which carries at its top a valve disk 16 with an opening 17 similar to opening 14 in disk 13. Rod 15 connects with a thumb piece 18 which passes out through a tight joint in casing 10. It can be readily seen that by turning thumb piece 18, the relation of openings 14 and 17 to each other may be varied as shown in Fig. 4 whereby a greater or smaller amount of gas may be allowed to pass. The effect of this adjuster is absolutely the same as increasing or decreasing the size of the feed pipe. I prefer to have a dial 19 fixed to the bottom of casing 10 and a pointer 85 on the base of thumb piece 18 whereby the adjustment may be determined from the outside of the regulator.

Vertical passage 12 continues beyond the adjusting disks and terminates in a slanting seat as shown. At the outlet thereof, I provide a delivery valve 30 which is pivoted at its lower edge at 31 and rests on the valve seat which is at an angle to the vertical. Stop 32 limits the opening or backward throw of this valve. At 33 I pivot weight wire 34 with a friction joint. That is, I make the pivot which is preferably a screw, tight enough so that the weight wire 34 will remain in any position in which it is placed. At the end of this weight wire, I attach a weight 35 which as is evident will tend to keep the valve normally closed. It is evident that as the gas escapes through passage 12 it will pass through valve 30 when its pressure is sufficient to overcome the weight of the valve and of weight 35. It is also evident that as the weight is thrown back, (see dotted lines), it ceases to exert as much pressure as in its original position. It is also evident that by moving the weight backward or forward on pivot 33, the amount of its pressure on valve 30 can be varied. By this construction, when one jet is open, the pressure of the valve is greatest, and a less quantity of gas escapes in proportion than when five or ten are open. When a large number of jets are open, the delivery valve is opened wide by the gas pressure behind. The delivery valve is so adjusted that, when closed, its center of gravity is in a radial line from the hinge 31, which radial line is at an angle of approximately 45° with the horizontal. Consequently as the valve rises, the component movement of the center of gravity affects the leverage so that it is much greater on the initial opening of the valve, and, as the valve opens, the leverage is so affected by the curved path traveled by the center of gravity that the actual closing pressure is quickly reduced to almost nothing. The stop 32 prevents a dead center being reached and the composition of forces reduces the pressure in about the course of the curved dotted line in Fig. 6. If the parts are adjusted for say fifteen jets, when all are open, valve 30 is fully open and weight 35 exerts a very slight closing pressure for the reason explained. Consequently the flow of the gas is practically unimpeded as it should be.

F is a cylindrical, gas tight jacket which screws into casting 10 and supports metal cap D. I prefer to provide in jacket F, a double boss 40 with a packing nut bored to serve as a tight bearing for the wire valve holder 41. This valve holder is a bent wire which can be forced in or out and turned from the outside of jacket F until its nose rests on the upper edge of valve 30 as shown by the dotted line, whereby that valve is held tightly closed. I insert a similar double boss and packing nut 50 through another side of jacket F and through this I pass a wire weight adjuster 51. This weight adjuster has at its inner end an arm with a double elbow 52 and is so located that this arm can be pushed in so as to be in front of or behind wire 34. It is evident that when valve 30 is held stationary by valve holder 41, the position of weight 35 may be changed from the outside of the regulator by revolving weight adjuster 51 thereby moving weight wire 34 back or forward on its pivot. This shifts the center of gravity to the desired point. After the weight is shifted, weight adjuster is drawn back out of the way.

I prefer to provide a screw cap D which carries a glass window 55 whereby the inside of the device may readily be inspected for adjusting the weight 35 or for other purposes. After passing through valve 30 into chamber 56, the gas which is now under proper pressure and in proper volume passes out through outlets 57 and 58 to the gas jets which are to be supplied.

Instead of the weight construction for the delivery valve as described, I can use a spring construction such as is shown in Figs. 9, 10 and 11. In this construction, inlet tube B enters inlet passage 11 which enters an inside tube 60 in which is a passage which corresponds with passage 12. This inside passage is shown as vertical but may be in any direction, as this construction is not affected by gravity. The end of this passage forms a seat for flap valve 61. The arm 63 is attached to valve 61 and extends up and over the outside of the tube 60. To the end of arm 63 I attach a tension spring 64. Through the bottom of casing 10, I insert a gas tight thimble 70 through which I screw an adjusting rod 71 which terminates in a swivel loop 72 through which I pass the free end of tension spring 64. The tension of spring 64 on valve 61 can be increased or diminished by screwing out or in rod 71.

Referring in Fig. 9 to the dotted line T which shows the arc of the circle centered at pivot 62 described by arm 63, it will be apparent that as valve 61 is lifted while the tension of the spring 64 is greater, the arm 63 will gradually approach line S which is at a right angle to a line projected through pivot 62 from the pivot end of spring 64 at 72. Where these lines meet is the dead center, but stop 65 prevents that point from being reached. It is apparent that as valve 61 rises, the closing pressure of spring 64 will be less for the reason specified. The effect of this spring actuated valve will thus be the same as the weight operated valve first described.

The inlet regulator B permits no more than a predetermined amount of gas to pass, no matter what the size of the main supply pipe may be and no matter how great the pressure of the gas therein may be or how suddenly that pressure may change. A less amount may pass through but not a greater. The gas thus reaches inner chamber or passage 12 at a uniform pressure. The quantity of gas for the maximum number of burners is regulated by the adjuster C which can be set by the dial 19 and the record of the setting kept.

The delivery valve, whether it is actuated by gravity or by a spring, is so arranged as to automatically reduce the pressure and friction on the gas as a greater number of burners are turned on and to increase the pressure and friction as they are turned off. As it rises, the pressure decreases, whereby the flow for more burners is less impeded than for fewer.

What I claim as my invention and desire to cover by Letters Patent is:—

1. In a gas pressure regulator, an outer casing, a removable transparent cover therefor, an inner passage therein a valve pivoted at the outlet of the inner passage, and an arm extended laterally from said valve, combined with a tension spring attached to said arm and swiveled to an adjusting member which screws through the bottom of said casing, and said member as described.

2. In a gas pressure regulator, an outer casing, an inner passage therein, and a valve pivoted at the outlet of the inner passage, combined with pressure means for closing said valve so arranged that the pressure is rapidly reduced as the valve opens, and means which project through the outer casing for adjusting the pressure means.

3. In a gas pressure regulator, an outer casing, an inner passage therein, a disk valve which is operative by the gas pressure behind it pivoted at the outlet of the inner passage, an arm extended laterally from said valve, a stop in front of the valve, and a tension spring connected to said arm and to such a point below said valve that its operative pressure on the valve will rapidly decrease as the valve is lifted by the gas pressure behind it.

4. In a gas pressure regulator, the combination with an outer casing provided with an outlet, of a removable transparent cover therefor, an inner passage in the casing the said inner passage forming a gas inlet and provided with a valve seat at its inner end, a disk valve which is operative by the gas pressure in said inner passage and is pivoted at the outlet thereof, an arm extended laterally from said disk valve, a stop in front of the valve, and a tension spring connected to said arm and to such a point below said valve that its operative pressure on the valve will rapidly decrease as the valve is lifted by the gas pressure behind it.

In testimony whereof I hereto affix my signature in presence of two witnesses.

FERDINAND N. LABELLE.

Witnesses:
GARDNER W. PEARSON,
JOHN J. DEVINE.